May 10, 1966  KIYOSHI INOUE  3,250,892
APPARATUS FOR ELECTRICALLY SINTERING DISCRETE BODIES
Filed Dec. 26, 1962  4 Sheets-Sheet 1
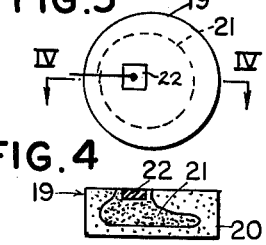
FIG. 1
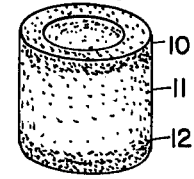
FIG. 2
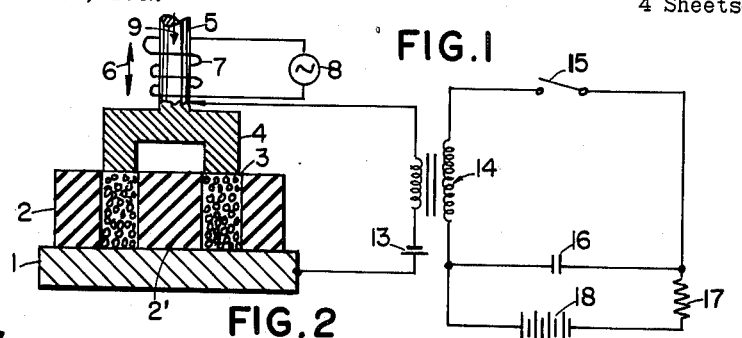
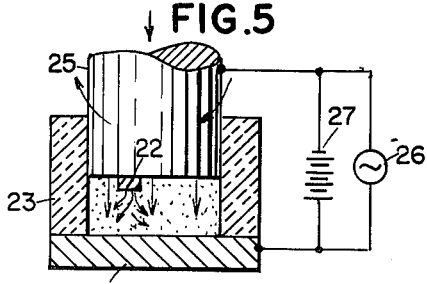
FIG. 3
FIG. 4
FIG. 5
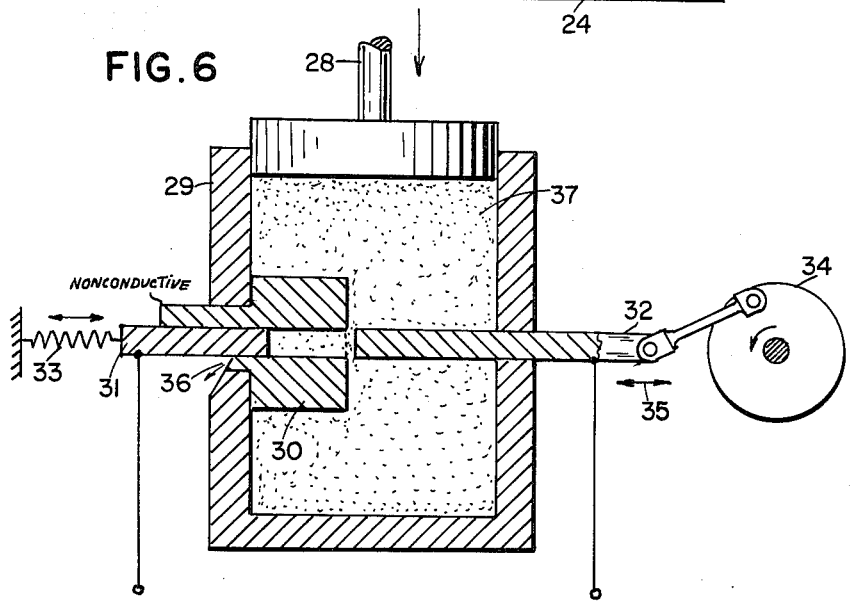
FIG. 6
KIYOSHI INOUE
INVENTOR.
BY Karl F. Ross
AGENT.

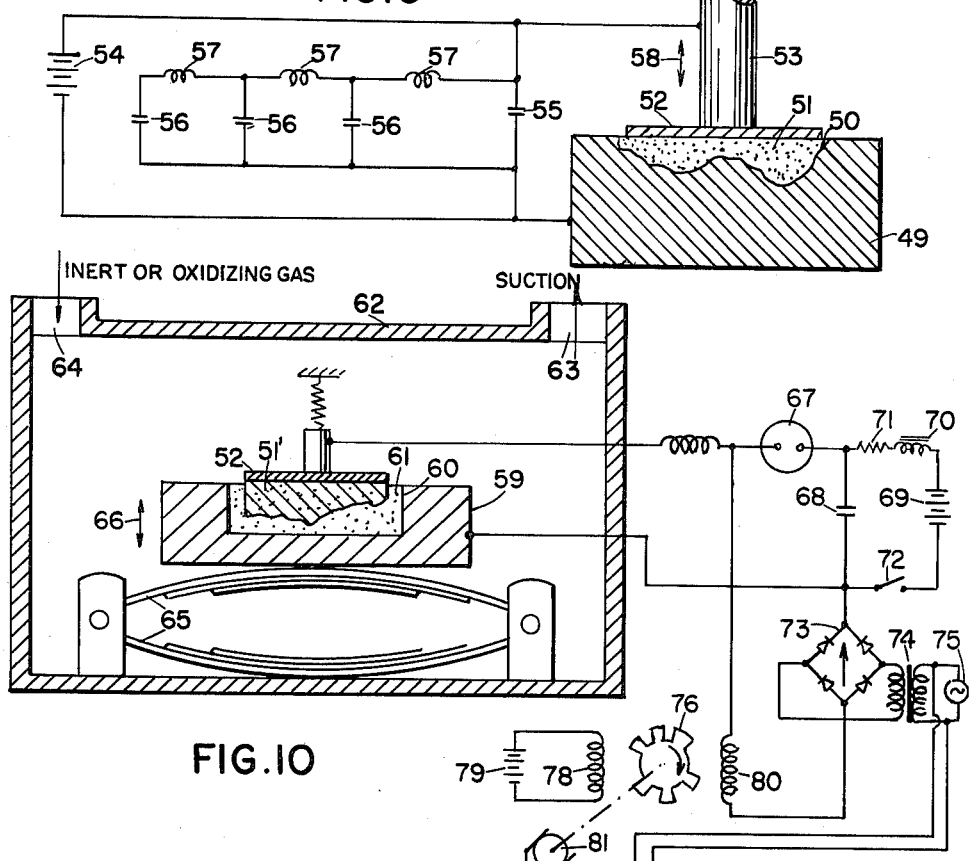

May 10, 1966  KIYOSHI INOUE  3,250,892
APPARATUS FOR ELECTRICALLY SINTERING DISCRETE BODIES
Filed Dec. 26, 1962  4 Sheets-Sheet 3
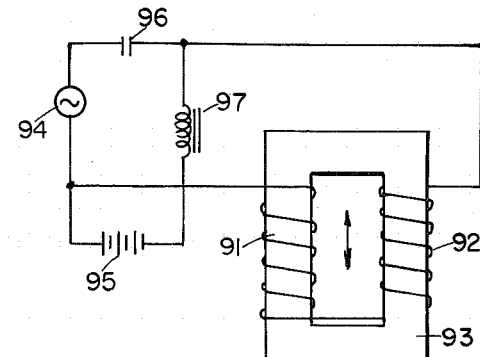
FIG.11
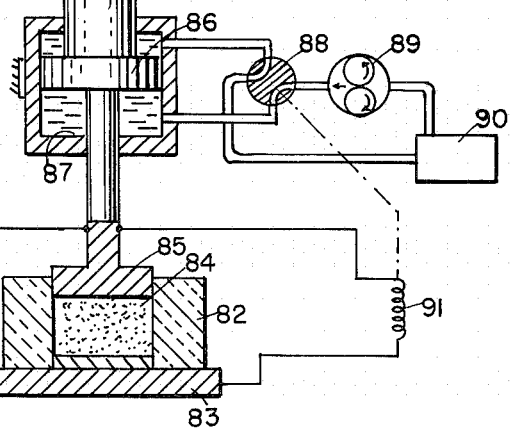
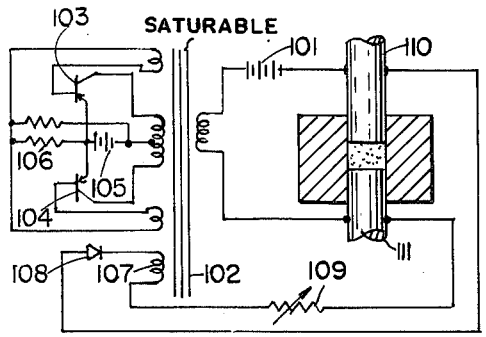
FIG.12
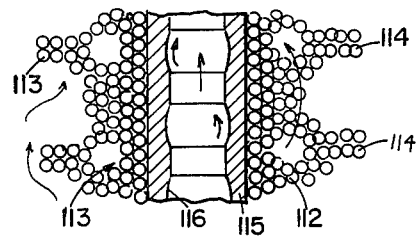
FIG.13
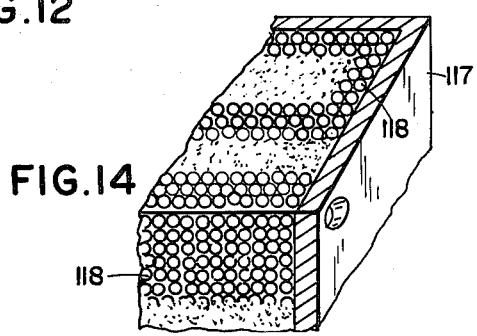
FIG.14
KIYOSHI INOUE
INVENTOR.
BY Karl F. Ross
AGENT May 10, 1966 KIYOSHI INOUE 3,250,892
APPARATUS FOR ELECTRICALLY SINTERING DISCRETE BODIES
Filed Dec. 26, 1962 4 Sheets-Sheet 4

KIYOSHI INOUE
INVENTOR.

BY Karl F. Ross

AGENT.

United States Patent Office 3,250,892
Patented May 10, 1966

3,250,892
APPARATUS FOR ELECTRICALLY SINTERING DISCRETE BODIES
Kiyoshi Inoue, 182 3-chome, Tamagawayoga-machi, Setagaya-ku, Tokyo, Japan
Filed Dec. 26, 1962, Ser. No. 247,387
Claims priority, application Japan, Dec. 26, 1961, 36/47,409; Dec. 29, 1961, 36/48,028; Jan. 16, 1962, 37/1,356; Jan. 20, 1962, 37/1,982; Jan. 29, 1962, 37/3,123; Feb. 7, 1962, 37/4,652, 37/4,653; Apr. 25, 1962, 37/16,930; May 1, 1962, 37/17,982; May 8, 1962, 37/18,546; May 30, 1962, 37/21,567; June 4, 1962, 37/22,767; June 7, 1962, 37/22,877; Sept. 19, 1962, 37/40,684; Oct. 9, 1962, 37/43,542; Nov. 30, 1962, 37/52,669
3 Claims. (Cl. 219—149)

The present invention relates to the sintering of discrete bodies or particles to form coherent objects and to the bonding of such bodies to substrates.

Earlier-known sintering techniques, which have found considerable utility in the field of powder metallurgy, in batteries, and in related arts, can generally be classified in three categories, depending upon the specific procedures used. The principal known method of sintering involves the heating, usually in electric or gas furnaces but also by induction or dielectric processes, of the mass of particles which is subjected to extremely high pressure, generally on the order of tons/cm.$^2$ (1000 kg./cm.$^2$) to effect a welding of the particles together under the elevated pressure. The other conventional methods involve the use of lower pressures, also on the order of tons/cm.$^2$, but temperatures sufficiently high to cause considerable flowing of the particulate material, and the use of adhesives or fusion agents which permit the use of lower temperatures but nevertheless require pressures upwards of, say, 500 kg./cm.$^2$. It has also been proposed to employ resistance-heating techniques which also require elevated pressure. All of these methods are characterized by the disadvantage that uniform heating is all but impossible and necessitate recourse to expensive hydraulic or pneumatic presses to provide the elevated pressures.

It is the principal object of the present invention to provide an improved apparatus for sintering discrete electrically fusible bodies together without the use of elevated pressures.

Yet another object of the invention is to provide inexpensive and compact apparatus for sintering discrete bodies.

The above and other objects, which will become apparent hereinafter, are attained in accordance with the invention by the sintering together of a plurality of discrete bodies by the steps of disposing the bodies in relatively light contacting relationship (i.e., under a mechanically applied pressure up to about 100 kg./cm.$^2$ but as low as the gravitational force urging some of the particles against others) and effecting a spark discharge between the bodies.

This technique is based upon the totally surprising discovery that, contrary to the weight of earlier beliefs that elevated pressures are required to carry out an effective sintering operation, relatively low mechanical pressures can be employed when spark discharge is used. The electric spark, with advantageously possesses a power on the order of hundreds and even thousands of joules, forces the particles into bonding contact with a pressure even greater than that attainable heretofore by mechanical means even when the particles are in relatively light contact. In fact, such light contact is necessary to the development of the necessary spark which also provides sufficient heat to cause the particles to bond together with great strength. It should be noted that earlier resistance heating techniques contrast sharply with the present method in that the earlier process required that the pressure applied to the mass of particles be sufficient to reduce the contact resistance to a level substantially equal to the internal resistance of the particles so that a high current could be passed through the mass to develop the necessary bonding heat. In contradistinction thereto, the present method requires that the contact resistance be greater than the internal resistance and, preferably, several times as great so that, at least during initial stages of the sintering operation, most of the applied energy is in the form of the spark discharge with relatively little being dissipated in resistive heating of the particles. Since the sintering action occurs immediately upon the space discharge, the completed body can be formed in a matter of seconds as compared with earlier methods requiring tens of minutes and even hours to effect complete sintering.

According to a more specific feature of the invention, a mass of discrete electrically fusible particles, preferably consisting predominantly of conductive metallic bodies, is disposed between a pair of electrodes which sustains the spark discharge. Since this mass naturally tends to shrink as sintering proceeds, means should be provided to maintain the electrodes in contact with the mass. To this end, the electrode means may be spring or gravity loaded or some positive drive means may be provided for maintaining the contact and, if desired, providing a mechanical pressure up to, say, 100 kg./cm.$^2$ when required. The spark discharge may be terminated upon the particles being welded together, at least preliminarily, while passage of the electric current may be continued without development of the spark to weld the particles further by resistance heating.

The mass of conductive particles may be admixed with up to 20% by weight of nonconductive particles (e.g. of a synthetic resin) which constitute a filler adapted to improve the properties of the sintered body. The filler may be designated to reduce the weight, decrease the coefficient of friction, provide voids by volatilization upon firing or the like. When a synthetic resin filler is employed, it is desirable to choose a material which can withstand elevated temperatures and yet is thermally fusible to a certain degree so that a bond is formed between the conductive and nonconductive particles. Suitable admixtures thus may be polyamides, polyesters and phenolic resins.

It is possible, according to the invention, to bond the conductive particles to continuous metal bodies. The latter may then be formed as electrodes or disposed in the particle mass in contact with the electrodes so that a firm fusion bond is produced at the interface; the continuous body, which need not be of metal, may also be imbedded in the mass of particles and physically locked within the coherent structure. Since the coherent structure may be more or less porous as required, this method has particular application in the electrochemical field wherein the unit can act as an electrode with the continuous member serving as the terminal. Advantageously, the continuous member should have an atomic size which is less than the atomic size of the material constituting the particles so that a firm adhesion is insured. Thus, the continuous member may serve as a support for a contoured sintered body in the form of a die for electrochemical or electric-discharge machining, stamping, pressing or hot forming of objects. Moreover, the sintered particles can, according to another feature of the invention, serve to increase fatigue resistance, tensile strength and other desirable characteristics of a metallic body or to constitute a corrosion-resistant layer therefor. The particles may, consequently, be composed of a stainless steel (e.g. ferrochrome) or another material capable of resisting electrolytic action.

It is desirable to superimpose a periodic current upon a direct current applied across the spark-discharge electrodes to avoid a preheating effect. The period current (e.g. an alternating current of less intensity than the direct current) may be terminated upon cessation of the spark discharge so that only a unidirectional field is applied to the sintered body. The periodic current can derive from a capacitor bridged across the electrodes or from some other alternating-current source. Advantageously, the capacitor works into a resistance, which may be the ohmic impedance of the spark gap or the conductors connecting the source with the electrodes, to provide a time constant which varies as sintering proceeds and eventually results in complete elimination of the periodic current. It has been discovered that such apparatus renders it possible to provide complete control of the density of the sintered articles since increased power and elevated electrical frequencies result in a greater compaction of the mass under the same mechanical pressures. It is contemplated, therefore, to provide means responsive to the density of the body (e.g. by determining the voltage drop thereacross) for controlling the power source by varying the intensity or frequency of the spark discharge. It has also been discovered that it is possible to control the density of the sintered body by controlled vibration of the particle mass before and during the spark discharge and regulating, within narrow limits as defined by the upper pressure range, the mechanical pressure applied to the particles.

Yet another feature of the invention resides in the provision of means for concentrating the electric current at certain regions of the particle mass so as selectively to increase the density of the sintered body in these regions. This concentration of current can be effected by disposing a conductive member within the mass, the conductive member having an internal resistance substantially less than the contact resistance of the particles. The current will thus preferentially pass through this member, which displaces particles having a resistance greater than its internal resistance, so that the member is both bonded firmly into the body and serves as the nucleus for a relatively dense core therein. This core, which is formed in situ, serves as a support for more porous outer regions and is particularly suited for use in electrochemical systems wherein the porosity of the body enables extremely high discharge rates. Alternatively, it is possible to concentrate the current density at certain regions of the sinterable mass by forming the electrodes so that there is a shortest current path through the region to be densified. It is also possible to effect densification by varying the intensity of the spark as it traverses the particle mass. Thus, if it is desired to produce an elongated porous body having relatively dense supporting extremities, the initial spark intensity may be three to four times that employed as the spark traverses the central portion of the mass. The spark intensity is again increased as the spark approaches the other extremity. In general, the spark will proceed from one electrode to the other as a consequence of the unidirectional basic electrical field applied across the electrodes although under certain circumstances a spark may proceed from each electrode toward the center. It is also contemplated to carry out the entire sintering operation with a single spark discharge in which case a space discharge between the electrodes is employed. To distribute the space discharge to peripheral portions of the mass, a nonconductive member may be disposed within the latter approximately midway between the electrodes. A dense region can also be obtained by disposing therein relatively small-sized particles while relatively large-sized particles are present elsewhere in the body.

The sintering operation can be carried out under any ambient atmosphere (e.g. oxidizing, inert or reducing, as desired) and even under liquid. In the latter case it is preferred that the liquid be a dielectric so as not to sustain the passage of spark-dissipating electrical currents by electrolytic action. This method of sintering also permits the molecular orientation of the sintered body so that the latter can, in effect, constitute a single crystal in many instances. It should be noted that molecular orientation can only be achieved with the aid of a relatively strong unidirectional electromagnetic force field. This force field is, in effect, present in the spark discharge and is maintained by the passage of unidirectional electric currents between the electrodes and through the mass. It has also been discovered that vibration of the mass and/or the electrodes during the spark discharge permits control of the crystal size and orientation.

The present apparatus is also adaptable to continuous formation of sintered bodies. A mass of sinterable particles can be continuously passed through a spark gap formed between a pair of electrodes, one of which may be constituted by the coherent, previously sintered material. It is also possible to provide means for repeatedly removing sintered bodies from between the electrodes for the production of tablets, pellets or the like. During continuous operation of the die, mold and electrodes may be cooled by air or water to disssipate the heat developed. In many cases the sinterable particles may be contained in a mold under their own weight while the spark discharge is carried out between electrodes extending into or forming part of the mold. It should be understood, however, that the slight mechanical pressure required may derive from one or more electrodes which may be spring biased or urged against the particles by gravitational force.

The above and other objects, features and advantages of the present invention will become more readily apparent from the following description, reference being made to the following drawing in which:

FIG. 1 is an axial cross-sectional view through a mold for forming a tubular sintered body with the circuit means therefor;

FIG. 2 is a perspective view of the body produced by this apparatus;

FIG. 3 is a plan view of a sintered electrode for batteries;

FIG. 4 is a cross-sectional view taken on line IV—IV of FIG. 3;

FIG. 5 is an axial sectional view through an apparatus for making the electrode;

FIG. 6 is a diagrammatic cross-sectional view through an apparatus for the mass production of sintered bodies;

FIG. 7 is a diagrammatic cross-sectional view illustrating the production of a conductive seal;

FIG. 8 is a view of this seal as employed in a battery;

FIG. 9 is an axial cross-sectional view of a device for producing a sintered die;

FIG. 10 is a cross-sectional view diagrammatically illustrating the manufacture of a forming die or mold using the sintering technique of the invention;

FIG. 11 is a partial cross-sectional view of still another apparatus according to the invention;

FIG. 12 illustrates a circuit diagram according to a modification;

FIG. 13 is an axial cross-sectional view through a heat-exchanger tube in accordance with the invention;

FIG. 14 is a perspective cross-sectional view through a radiator produced by the present method;

Figures 15, 16:
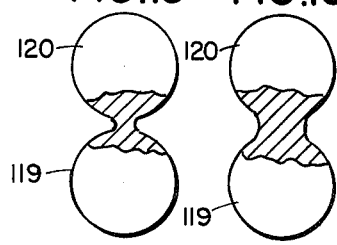
FIGS. 15 and 16 are partial cross-sectional views diagrammatically illustrating two stages of the instant method.

In FIG. 1 there is shown an apparatus for producing tubular porous bodies which can serve as filters or the like. The apparatus comprises a conductive base plate 1 upon which is disposed a tubular mold 2 having a core 2'. The mold cavity 3 of this mold contains a mass of sinterable particles which is compacted under the weight of an electrode 4. The shank 5 of this electrode is surrounded by a coil 7 which is supplied by an alternating-current source 8 for vibration of the electrode 4 in the direction of the arrow 6. Electrode 4 is urged downwardly (in the direction of arrow 9) by gravitational force. A battery 13 is a bridged, in series with the secondary of a transformer 14, across the electrodes 1 and 4 while another direct-current source 18 is connected in series with a load resistance 17 represented as a separate resistor but actually the resistance of the conductors tied to transformer 14. A capacitor 16 is connected across the battery 18 and resistor 17.

A mass of conductive powder or an admixture of conductive powder with up to 20% by weight of a nonconductive powder is disposed in the mold cavity 3 and vibrations initiated in the direction of arrow 6. With a frequency determined by the time constant of resistor 17 and capacitor 16, the latter periodically charges from battery 18 and discharges across the primary winding of transformer 14 when the switch 15 is closed. A pulsed current superimposed upon direct current of battery 13 is thus applied to the electrodes 1 and 4. A spark discharge is initiated between the electrodes 1 and 4 and the particle mass in contact therewith. Since the particles are in relatively light contacting relationship, this spark proceeds through the mass to form a coherent sintered body.

In FIGS. 3 and 4 there is shown a sintered nickel electrode for use in nickel/cadmium batteries and capable of high-rate discharges. The electrode 19 has a peripheral zone 20 of relatively porous material and an internal core 21 of relatively dense material which is bonded to a contact plate 22. Zone 21 is formed in situ by the concentration of electric current as can be seen in FIG. 5. In the latter figure, a nonconductive mold 23 is disposed upon a conductive electrode plate 24 which is juxtaposed with a rotatable electrode 25. A direct-current source 27 is bridged across these electrodes in parallel with an alternating-current source 26.

The apparatus in FIG. 6 serves for the serial production of sintered bodies and comprises a piston 28 which urges a mass 37 of sinterable powder within a casing 29 into the cavity formed within a mold 30. The mechanical pressure is, however, less than 100 kg./cm.² A pair of electrodes 31, 32 are slidable into the mold cavity, electrode 32 being provided with a drive source 34 for reciprocating it in the direction of arrow 35. Electrode 31 is spring biased by a coil spring 33 and yields as member 32 is positively reciprocated so that a pressure of up to 100 kg./cm.² is maintained upon the mass within the mold cavity. The electrodes are connected across a source of direct current and of periodic current superimposed thereon. With each reciprocation of electrode 32, a spark discharge is sustained between the electrodes which results in sintering of a body within the cavity of mold 30. As electrode 32 moves into its extreme left-hand position, it pushes the sintered body thus formed out of the cavity from which it falls in the direction of arrow 36. When electrode 32 is again withdrawn from the cavity, piston 28 pushes additional powder into the latter for repetition of the operation.

In FIG. 7 I show the in situ formation of a sintered body in forming a liquid tight seal. A battery casing 38 is provided with a bore which constitutes a mold for a mass of sinterable particles 39 which is disposed between electrodes 40 and 41. The latter are bridged by a direct-current source 44 in series with a resistor 43 and by a capacitor 42. The spark discharge developed across the electrodes 40, 41 results in a sintering together of the particles 39 and a thermobonding of the sintered body with the battery casing 38 which may be of a thermoplastic or syntheic-resin material. Particles, having a maximum size of approximately 10 microns, can be used in this connection to produce a liquid-impermeable seal which nevertheless permits the escape of gases and is conductive.

As can be seen in FIG. 8, the sintered body 39' thus resulting may be spark welded to a mass 45 of sintered particles carried by a battery electrode 46 and to a mass 47 of similarly sintered particles provided on the terminal tab 48. This arrangement provides means for completely sealing the terminal to the case to prevent the escape of liquids.

In FIG. 9 there is shown an arrangement for producing dies. A conductive block 49 is formed with a contoured mold cavity 50 which contains a mass of particles 51. A counterelectrode 52 overlies this mass of particles and is provided with a support rod 53 via which it is spring biased into contact with the particles. A battery 54 is bridged across the electrodes 52 and 49 together with a capacitor 55 while a delay line, consisting of inductances 57 and capacitances 56, is also connected across capacitor 55. This delay line provides a series of secondary pulses which follow the initial spark discharge as produced by capacitor 55.

In FIG. 10 I show another arrangement, this time for the production of a female die, wherein the carbon-steel block 59 is provided with a cavity 60 containing the particles 61. An electrode 51' of sintered metal is carried by a plate 52 and serves to form the contoured sintered female die. The entire unit is enclosed in a casing 62 from which air may be aspirated at 63 and into which a suitable atmosphere may be introduced via an inlet 64.

The block 59 is carried by a pair of leaf springs 65 and is vibrated in the direction of arrow 66 by suitable means not shown. In the present embodiment the delay line disclosed in connection with FIG. 9 is dispensed with and the circuit means includes a spark gap 67 of predetermined dimension which is tied in series with the capacitor 68 across the electrodes 52 and 59. A battery 69 in series with a choke 70 and the lead resistance 71 is bridged across the capacitor 68 with a switch 72. The characteristics of this circuit are so selected that the pulsed direct-current discharge of capacitor 68 and battery 69 is insufficient to bridge the spark gap 67 during initial sintering when a sintering gap is present between the electrodes but is, however, capable of continuously discharging across gap 67 when an initial sintering of the powder has been effected. To produce a breakdown or discharge across gap 67 during the earlier stages of operation there is provided an additional circuit consisting of a rectifier bridge 73 which is tied to the secondary of an isolating transformer 74 supplied by an alternating-current source 75. This direct current does not flow across the gap 67 and the capacitor 68 until supplemented by a triggering pulse derived from a rotatable inductor 76 of magnetically permeable material. An energizing coil 78 is supplied by a direct-current source 79 to develop a constant magnetic field which, when traversed by the projections of wheel 76, is concentrated and swept across a pick-up coil 80, in series with rectifier bridge 73. Rotation of wheel 76 by motor 81 results in the periodic sweeping of coil 80 by the tabs with a consequent induction of a primary breakdown pulse and a plurality of lesser pulses. The pulsed current (e.g. at a frequency of about 400 cycles per second) continues only until the spark discharge through the particles 61 terminates. Thereafter, with gap 76 in a substantially constant state of discharge, a direct current is applied to the electrode by battery 69 as supplemented by bridge 73.

The apparatus shown in FIG. 11 can be used for the production of sintered bodies under continuously controlled conditions. The nonconductive mold 82 is disposed upon an electrode plate 83 and contains the powder 84 which is lightly compressed by a counterelectrode 85. The mechanical pressure of the latter is determined by the position of its piston 86 which is received within a hydraulic cylinder 87. Hydraulic fluid is supplied to the latter by a distributing valve 88 which is fed by a pump 89 from a reservoir 90. The distributing valve 88 is controlled by a solenoid coil 91 bridged across the electrodes 83 and 85 and responsive to the potential drop thereacross. It will be immediately apparent that this potential drop is a direct measure of the density of the particles since greater compaction involves a decreased resistance thereacross. Additionally, there is provided a magnetostrictive vibrator for oscillating the electrode 85 within limits. This vibrator comprises a pair of windings 91, 92 connected in aiding relationship and wound about the shanks of a D-shaped coil 93. These coils are energized by an alternating-current source 94 whose output is superimposed upon a direct-current voltage derived from a battery 95. A capacitor 96 is tied in series with source 94 across the coils 91, 92 while a choke 97 is serially connected with battery 95. The direct-current biasing potential applied to the electrodes 83, 85 derives from a rectifier bridge 98 which is fed by a secondary winding of transformer 99 whose other secondary applies a super-imposed alternating current. Again the electrodes are bridged by a capacitor 100.

Whereas the arrangement shown in FIG. 12 permits control of the density of the sintered body by varying the mechanical pressure applied thereto, it is preferable in many instances to control the density by the characteristics of the spark discharge. This may be effected by regulating the frequency of the discharge at least during the early stages. To this end the direct-current source 101 is connected in series with the output winding of a transformer 102. This transformer forms part of a varying-frequency oscillator and is saturable to control this oscillator. The oscillator consists of a pair of push-pull transistors 103, 104 whose emitters are energized by a battery 105 in series with respective sections of the primary winding of the transformer. The base of each transistor is serially connected with the energizing windings of the transformer and returned to the emitter via a suitable biasing resistor 106. The transformer is also provided with a control winding 107 in series with a rectifier 108 and a variable resistor 109 for determining the degree of saturation of the core and thus the frequency of oscillation. The control circuit is bridged across the electrodes 110, 111 and detects the direct-current-voltage drop thereacross. This circuit is poled so as to increase the frequency of the oscillation should the density of the sintered body fall below a predetermined value.

In FIGS. 13 and 14 there are illustrated heat-exchange arrangements produced by the method and apparatus of the present invention. The structure of FIG. 13 makes use of a sintered sheath 112 to provide a fluid-permeable layer of high surface area around and through which a gas or liquid can pass as indicated by the arrows 113. This layer can be formed with the usual fins 114 and is bonded to the metallic tube 115 which is internally contoured (i.e. provided with annular depressions 116) to increase turbulence in the fluid flowing therethrough. Radiator 117 of FIG. 14 is provided with channels 118 formed by relatively coarse particles (particle size between 60 and 100 microns) between dense rows formed by fine particles (5 to 6 microns). The entire body, which can be formed in a single sintering operation by the methods previously described, can be composed of copper particles and has excellent heat-exchange characteristics.

FIGS. 15 and 16 are schematic illustrations as to what occurs in the course of the present method. During the initial stages of sintering, the bodies 119 and 120, which are generally of irregular configuration in practice, are in light contact or even slightly spaced so that a spark discharge is formed between them. This discharge forces them into contact under considerable pressure and effects a flow of material between them at their contact region. Subsequent passage of current (FIG. 16) causes the particles to flow together to a greater extent and, since it is effected under the force field of a unidirectional electric current, results in an internal crystal orientation so that the fusion point is indistinguishable from the remainder of each particle. They thus constitute a single crystal. This effect characterizes substantially all of the methods presently described.

Figures 17, 18:
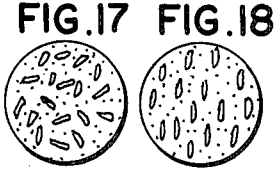
FIG. 17 is a representation of a sintered body prior to molecular orientation.
FIG. 18 is a similar view of this body subsequent to such orientation in accordance with the invention.

The molecular orientation of sintered bodies is more dramatically represented in FIGS. 17 and 18 wherein magnifications of oriented and nonoriented bodies of sintered dendritic material are shown.

Figure 19:
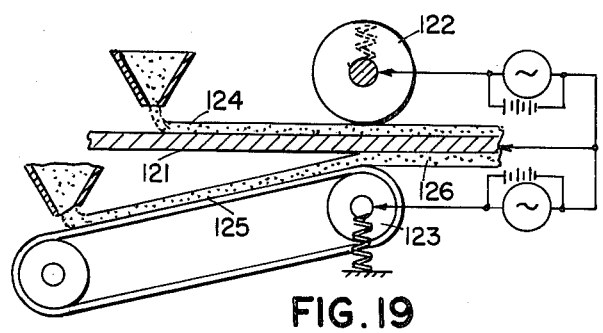
FIG. 19 is an elevational view, partly in section, of an apparatus for continuously depositing a sintered layer upon a substrate.

The apparatus of FIG. 19 permits continuous formation of sintered layers upon a metal substrate. The substrate 121 may be a metal sheet to be clad with the sintered metal layer to improve its fatigue and corrosion resistance, is passed between a pair of rollers 122, 123 serving as counterelectrodes for the sheet. As the upper layer of, say, ferrochrome powder 124 is deposited upon the sheet and bonded thereto while being sintered into a coherent coating upon passage into the spark zone at electrode 122, the lower layer 126 is carried by the conductive band 125 into the spark zone and bonded thereat to the substrate.

Figure 20:
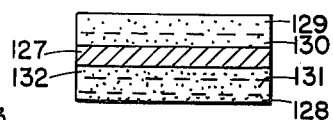
FIG. 20 is a cross-sectional view through a sintered body having a continuous metal core and multiple layers.

The substrate 127 of FIG. 20 is shown to be provided with a plurality of superimposed layers of sintered metal. It is thus possible, merely by positioning a series of layers of different metal particles in one of the molds previously described to bond, say, an aluminum layer 128, 129 to a layer of copper 130, 131. This in turn may be fused directly to the metal or to a nickel layer 132 thereon.

Figure 21:
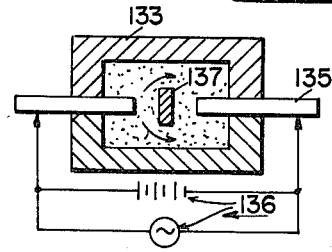
FIG. 21 is an axial cross-sectional view through a mold for producing sintered bodies by special discharges.

In the arrangement of FIG. 21, a casing 133 forms a separable mold into which extend the juxtaposed spaced electrodes 134 and 135. The circuit means 136 develops a space discharge, which is spread by the dielectric distributor 137 to the periphery of the body, between the electrodes to sinter the particles together and imbed the electrodes therein.

Figures 22, 24:
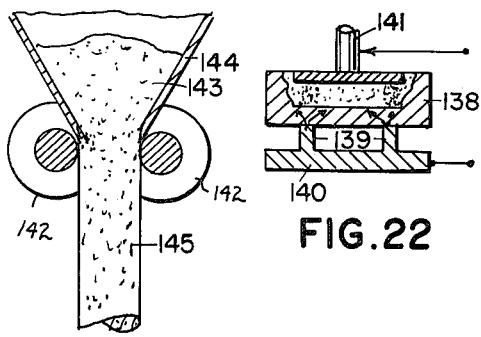
FIG. 22 is a view similar to FIG. 9 illustrating selective densification of the sintered body.
FIG. 24 is a cross-sectional view taken along the line XXIV—XXIV of FIG. 23.

Another device for localizing the passage of current in the sintering of powders is illustrated in FIG. 22. The conductive but highly resistant block 138, which may be composed of carbon, is engaged by spaced contacts 139 of an electrode 140. The spark discharge developed between a counterelectrode 141 and the block 138 is localized in the region of contacts 139 since these regions constitute low-resistance paths, thereby producing a sintered body having increased density at these regions.

Figure 23:
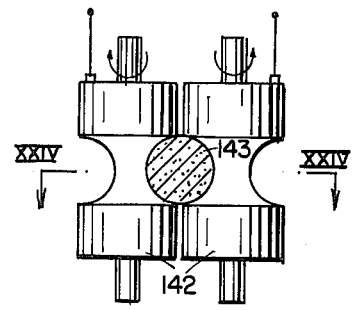
FIG. 23 is a partial bottom view of an apparatus for continuously producing sintered rods according to the invention.
Figure 25:
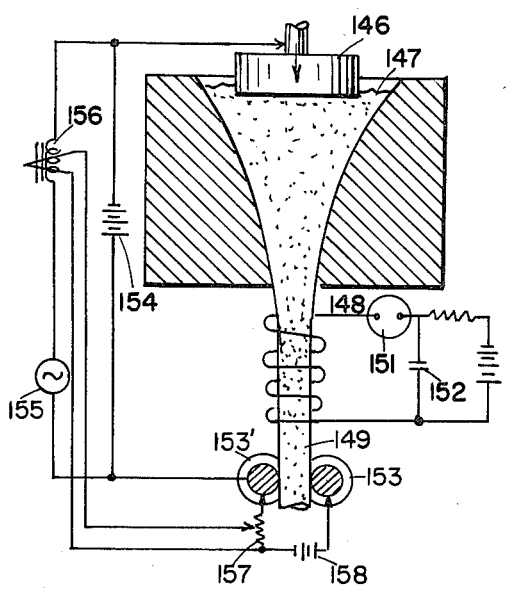
FIG. 25 is a view similar to FIG. 24 illustrating a modification of the continuous process.

The apparatus of FIGS. 23 and 24 is designed to permit the continuous sintering of particles into a coherent rod. The apparatus comprises a pair of shaping rollers 142 which are spaced from each other and pass a spark discharge through powdered metal 143, supplied by the hopper 144, therethrough. The emanating rod is coherent and may constitute an electrode as indicated in FIG. 25.

In this case the feed plunger 146 applies a light mechanical pressure to the powder within the hopper 147 whose constriction 148 forms a die. Since the previously formed rod 149 is coherent and conductive, it may constitute an electrode so that a spark discharge results at the die. A magnetic shaping of the coherent rod, which nevertheless is somewhat plastic as a result of its elevated temperature, is carried out by applying a pulsed current through a surrounding winding. This pulsed current is developed across a spark gap 151 by a capacitor 152 as previously described.

A pair of rollers 153, 153' serve as contacts for the rod 149. Roller 153' is connected to one output terminal of a circuit whose battery 154 bridges the electrodes in parallel with an alternatingf current source 155. The latter is, in turn, tied to a saturable reactor 156 which controls the A.-C. power lewel and has its biasing winding in series with the wiper of a potentiometer 157. The latter is in circuit with a biasing battery 158 across the rollers 153, 153'. Should the density of the rod 149 suddenly fall, the voltage drop detected across rollers 153, 153' will increase to cause the saturable reactor to raise the power level and vice versa.

What is claimed is:

1. Apparatus for sintering discrete electrically conductive particles, comprising a pair of juxtaposed spaced electrodes; retaining means for supporting a mass of said particles in relatively light contacting relationship between said electrodes; and circuit means for applying a direct current across said electrodes through said mass while superimposing a periodic current thereon to produce a spark discharge between said particles, thereby fusing said particles together, said circuit means including a source of direct current and capacitive means in parallel therewith bridged across said electrodes, said capacitive means constituting part of a resonant network connected across said electrodes for supplying an alternating current constituting said periodic current.

2. Apparatus for sintering discrete electrically conductive particles, comprising a pair of juxtaposed spaced electrodes; retaining means for supporting a mass of said particles in relatively light contacting relationship between said electrodes; and circuit means for applying a direct current across said electrodes through said mass while superimposing a periodic current thereon to produce a spark discharge between said particles, thereby fusing said particles together, said circuit means including a source of direct current and capacitive means in parallel therewith bridged across said electrodes, said apparatus further comprising vibrating means for oscillating at least one of said electrodes during said discharge, said capacitive means constituting part of a resonant network connected across said electrodes for supplying thereto an alternating current constituting said periodic current.

3. Apparatus for sintering discrete electrically conductive particles, comprising a pair of juxtaposed spaced electrodes; retaining means for supporting a mass of said particles in relatively light contacting relationship between said electrodes with said electrodes bearing on said mass with light contact; and circuit means for applying a direct current across said electrodes through said mass while superimposing a periodic current thereon to produce initially an impulsive spark discharge between said particles, thereby fusing said particles together and thereafter heating said mass by continuous flow of electric current, said circuit means including a source of direct current and capacitive means in parallel therewith bridged across said electrodes for delivering a succession of pulses thereto to generate said spark discharge.

References Cited by the Examiner

UNITED STATES PATENTS

| | | | |
|---|---|---|---|
| 1,896,854 | 2/1933 | Taylor | 13—23 |
| 2,040,215 | 5/1936 | Rava | 219—135 |
| 2,097,502 | 11/1937 | Southgate | 219—149 X |
| 2,139,160 | 12/1938 | Hebeler | 219—135 X |
| 2,889,386 | 6/1959 | Gruber et al. | 13—13 |
| 3,014,155 | 12/1961 | Inoue | 219—69 X |
| 3,021,270 | 2/1962 | Tarbox et al. | 204—312 |
| 3,023,462 | 3/1962 | Taylor et al. | 75—200 |
| 3,081,498 | 3/1963 | Davis et al. | 75—200 |
| 3,078,325 | 2/1963 | Dillon et al. | 13—9 |
| 3,079,450 | 2/1963 | Senior | 13—9 |
| 3,118,052 | 1/1964 | Lippart et al. | 219—125 X |

FOREIGN PATENTS 833,513   4/1960   Great Britain.

RICHARD M. WOOD, *Primary Examiner.*

REUBEN EPSTEIN, *Examiner.*

R. L. GOLDBERG, R. F. STAUBLY,
*Assistant Examiners.*